United States Patent [19]

Mukai et al.

[11] Patent Number: 5,019,854
[45] Date of Patent: May 28, 1991

[54] DISPLAY SYSTEM FOR DISPLAYING INFORMATION IN THE VIEWFINDER OF A CAMERA

[75] Inventors: Hiromu Mukai; Kohtaro Hayashi; Yasuo Maeda, all of Osaka, Japan

[73] Assignee: Minolta Camera Kabushiki Kaisha, Osaka, Japan

[21] Appl. No.: 406,703

[22] Filed: Sep. 13, 1989

[30] Foreign Application Priority Data

| Sep. 16, 1988 | [JP] | Japan | 63-232034 |
| Aug. 30, 1989 | [JP] | Japan | 1-221763 |
| Sep. 4, 1989 | [JP] | Japan | 1-227577 |
| Sep. 4, 1989 | [JP] | Japan | 1-227578 |

[51] Int. Cl.$^5$ ............................................. G03B 17/18
[52] U.S. Cl. .................................. 354/471; 354/402; 354/432; 354/475; 354/474
[58] Field of Search .............. 354/471, 465, 466, 474, 354/475, 432, 402

[56] References Cited

U.S. PATENT DOCUMENTS

| 4,299,462 | 11/1981 | Suzuki et al. | 354/471 |
| 4,465,355 | 8/1984 | Murakami et al. | 354/475 |
| 4,572,617 | 2/1986 | Masaki et al. | 350/339 R |
| 4,856,869 | 8/1989 | Sakata et al. | 354/471 |

*Primary Examiner*—Russell E. Adams
*Attorney, Agent, or Firm*—Willian Brinks Olds Hofer Gilson & Lione

[57] ABSTRACT

A display system for displaying information in the viewfinder of a camera, capable of displaying a positive pattern indicating a distance measuring area and a light measuring area on a transparent background so that a photographing field can be seen through the transparent background of the pattern. The display system comprises a liquid crystal display of a guest-host type disposed near the focal plane of the optical system of the viewfinder. The liquid crystal display comprises transparent electrodes provided with a pattern indicating distance measuring areas and light measuring areas, a liquid crystal of a cholestericnematic phase transition type having a negative anisotropic dielectric property as host, and a dichroic coloring matter having an anisotropic light absorption property as guest. The pattern having a high opacity is displayed on a transparent background in the viewfinder in a satisfactory contrast to the background.

20 Claims, 7 Drawing Sheets

DISPLAY SYSTEM FOR DISPLAYING INFORMATION IN THE VIEWFINDER OF A CAMERA

BACKGROUND OF THE INVENTION

1. Field of the Invention

The present invention relates to a display system for displaying information in the viewfinder of a camera, allowing the object to be seen in the viewfinder and capable of superposing photographing data in a pattern on the image of the object.

2. Description of the Prior Art

Figure 11:
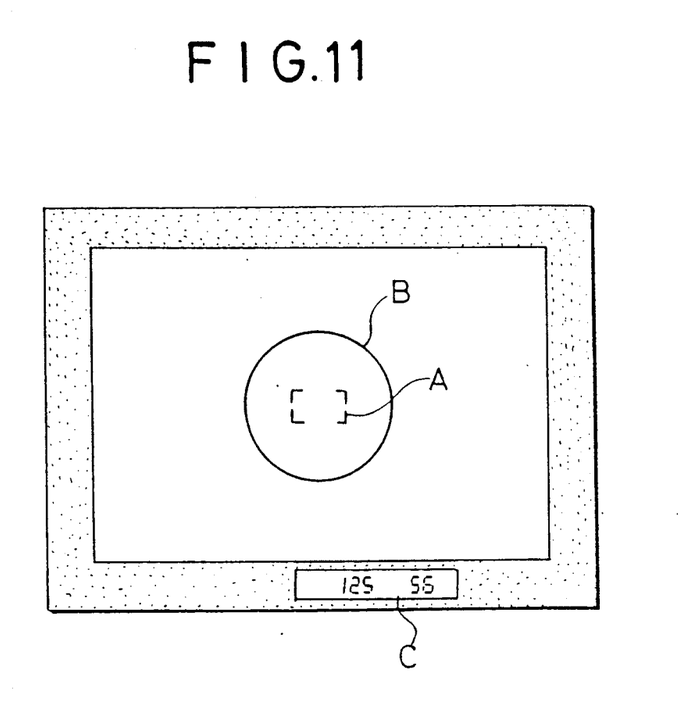
FIG. 11 is an illustration of assistance in explaining a conventional display system for a viewfinder.

As shown in FIG. 11, a distance measuring area A, a light measuring area B and photographing data C are displayed within the viewfinder of a camera. The photographing data C is displayed in static images or flickering images to enable the photographer to recognize the photographing data C visually only when necessary. Accordingly, the transmittance of the background of the photographing data C may be low provided that the photographing data C form a high contrast to the background. However, when the photographing data is displayed within the focusing screen of the viewfinder, the photographing data is displayed on a background having a high transmittance, because the object is displayed in a dark image on the focusing screen and it is difficult to recognize the image clearly if the background has a low transmittance. Furthermore, the photographer is unable to recognize the photographing data precisely if the photographing data is not displayed in high contrast with the background.

The liquid crystal display (hereinafter abbreviated to "LCD") of a twisted nematic phase type used generally as a display has two polarizing plates. Since the polarizing plates intercept not less than 50% of the incident light, the LCD is unable to display bright images in the viewfinder. When the polarizing plates are exposed to a high temperature, the life of the same is shortened and the durability of the same is deteriorated. Accordingly, it is desirable to use a LCD not using any polarizing plates as a display for the viewfinder. An LCD of a guest-host type employs no polarizing plate. Generally, the LCD of a guest-host type employs a nematic liquid crystal (Np liquid crystal) having a positive anisotropic dielectric property (a property that the orientation factor goes perpendicular to the surfaces of the electrodes when a voltage is applied across the electrodes) as host (base material) and a dichroic coloring matter having an anisotropic light-absorption property as guest (admixture). This Np liquid crystal transmits light when the orientation factor is perpendicular to the surfaces of the electrodes (homeotropic orientation), and obstructs light when the orientation factor is parallel to the surfaces of the electrodes (homogeneous orientation). Therefore, the LCD employing an Np liquid crystal is a negative LCD which displays photographing data in a transparent pattern (a negative image) on an opaque background when a voltage is applied thereto. To display photographing data in a positive pattern (a positive image) on the negative LCD, a voltage is applied continuously to the back electrode, i.e., the electrode of the background sheet, and a voltage is applied to or removed from the front electrode, i.e., the electrode of the viewing sheet, to control the light transmittance of the LCD so that the photographing data is visible in an opaque image on the transparent background.

Although the light transmittance of the negative LCD is higher than that of the LCD employing polarizing plates, the transparency of the negative LCD is not sufficiently high and the opacity of the opaque portion (a portion in which the molecules are in a homogeneous orientation) of the same is insufficient and hence the contrast between the indication and the background is low because the orientation factor is not arranged in a perfect homeotropic orientation when a voltage is applied across the electrodes. Although an electrode for maintaining the background transparent is formed around leads connected to the transparent electrodes of the pattern, the leads are visible together with the pattern of photographing data because the voltage is removed from the leads when the pattern is displayed.

U.S. Pat. No. 4,572,617 proposes a method for enhancing the transparency of the LCD to increase the contrast between the pattern of photographing data and the background. This method mixes a surface active agent in the liquid crystal to enhance the homeotropic orientation to keep the background opaque, and rubs the front electrode in one direction with cloth for orientation to increase the opacity when the molecules are arranged in a homogeneous orientation. This method requires different orientation processes respectively for the front electrode and the back electrode, which increases the steps of manufacturing process and requires difficult processes.

Another method proposed to increase the contrast between the pattern of photographing data and the background holds two liquid crystal layers between transparent electrodes of the same shape with the orientations of the orientation factors perpendicular to each other. Such an arrangement of the liquid crystal layers requires three glass sheets, which increases the thickness of the LCD and requires accurate alignment of the corresponding patterns of the four transparent electrodes.

SUMMARY OF THE INVENTION

It is a principal object of the present invention to provide a display system for the viewfinder of a camera, capable of displaying photographing data in a high contrast to the background over the image of the object within the viewfinder.

It is another object of the present invention to provide a display system for the viewfinder of a camera, employing an LCD having an improved transmittance, and capable of displaying photographing data in a pattern having a high opacity in a satisfactory contrast to the background.

Other objects of the present invention will become more fully understood from the following detailed description with reference to the accompanying drawings.

DETAILED DESCRIPTION OF THE PREFERRED EMBODIMENTS

Figure 1:
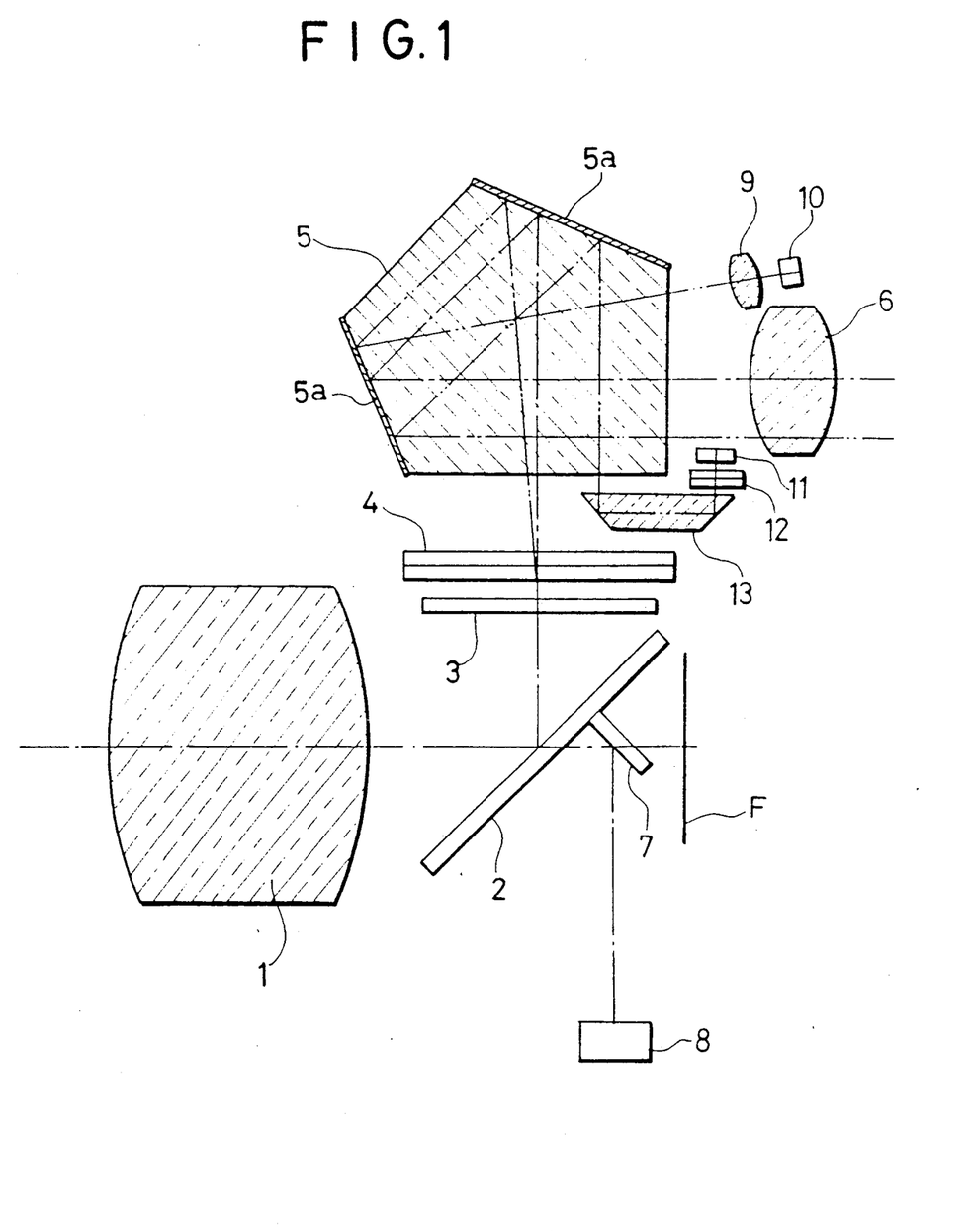
FIG. 1 is a diagrammatic illustration of the optical system of a single-lens reflex camera having a viewfinder incorporating a display system in a first embodiment according to the present invention.

Referring to FIG. 1, there are shown a photographic lens 1, a quick return mirror 2 having a translucent central portion, a focusing plate 3 disposed at a position conjugate with respect to the film surface F, a first LCD 4 of a cholesteric-nematic phase transition type having a negative anisotropic dielectric property, a pentagonal prism 5, reflectors 5a of which silver is evaporated on, an eyepiece 6, a mirror 7 disposed behind the quick return mirror 2 at a position corresponding to the central portion of the quick return mirror 2, a light receiving element 8 for automatic focusing, a lens 9 for measuring subject brightness, a light receiving element for measuring light, a luminous element 11, a second LCD 12 of a TN type (twist nematic type) for displaying photographing data including shutter speed and aperture value in the margin of a display area, and a prism 13 for guiding images displayed on the second LCD 12 to the viewfinder.

The focusing plate 3 is formed with polymethacrylate (PMMA) synthetic resin contained ultra-violet rays absorption material. Ultra-violet rays absorption material may be selected from such a material as salicylate, benzophenone, benzotriazole and cyanoacrylate.

The liquid crystal material of LCD is affected and broken down by the ultra-violet rays of incident from the photographic lens. But, the ultraviolet rays is cut by the focusing plate made from the resin contained ultra-violet rays absorption material. If it is necessary to protect the LCD from the ultraviolet rays of incident from the eye-piece, it can be done by the use of eye-piece made from the same resin as PMMA or polycarbonate resin contained ultra-violet rays absorption material.

Figure 2:
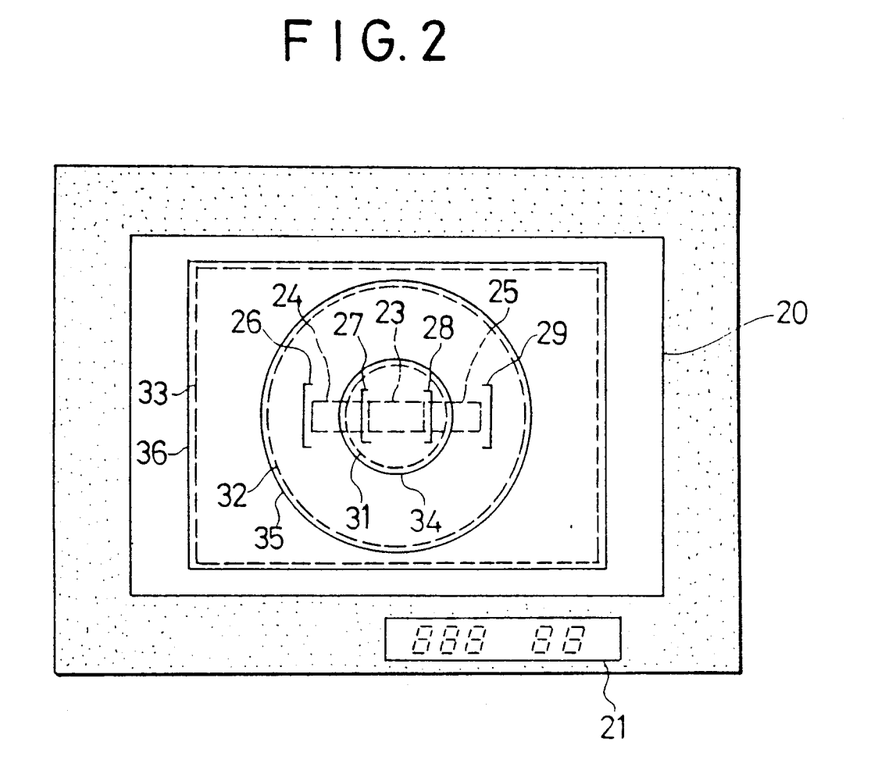
FIG. 2 is an illustration of a pattern of photographing data displayed within the viewfinder by the display system of FIG. 1.

Referring to FIG. 2, there are shown a display frame 20 in which the image of the object is displayed, and the photographing data 21, namely, the image of the second LCD 12 displayed in the margin of the display frame. Areas 23, 24 and 25 demarcated with dotted lines are distance measuring areas in an object field and bracket patterns 26, 27, 28 and 29 are provided to enable the photographer to selectively determine a distance measuring area on the first LCD 4. The first LCD 4 is driven by a driving circuit so as to display the bracket patterns 27 and 28 and to erase the bracket patterns 26 and 29 when the central distance measuring area 23 is selected (spot AF), and so as to display the bracket patterns 26 and 29 and to erase the bracket patterns 27 and 28 when all the distance measuring areas 23, 24 and 25 are selected (wide AF).

Areas 31, 32 and 33 demarcated with dotted lines are light measuring areas in an object field. Patterns 34, 35 and 36 correspond to the light measuring areas 31, 32 and 33, respectively, and these patterns are provided to be recognized as the light measuring area by a photographer. The driving circuit drives the first LCD 4 so that one of the patterns 34, 35 and 36 is displayed and the rest of the patterns are erased.

Figure 3:
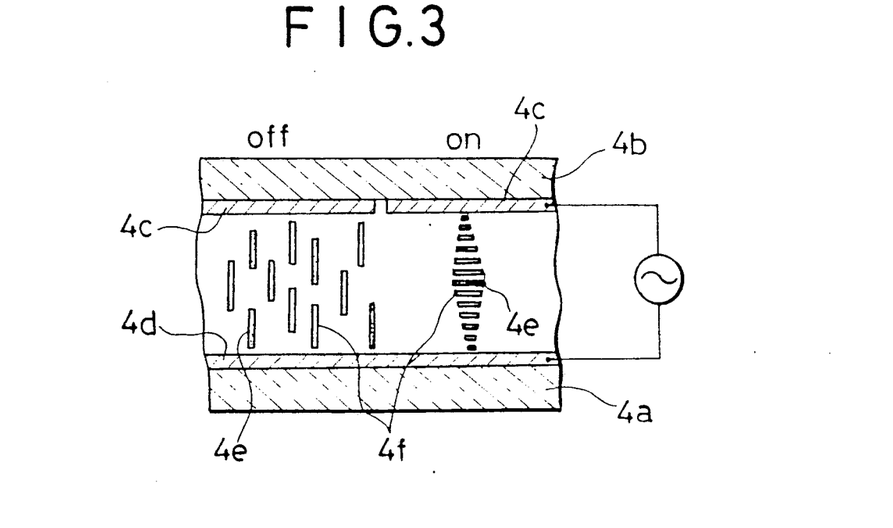
FIG. 3 is an enlarged fragmentary view of a LCD.

Referring to FIG. 3 showing a portion of the first LCD 4 of a cholesteric-nematic phase transition type, which is an essential component of the display system of the present invention, in an enlarged fragmentary sectional view, there are shown transparent glass substrates 4a and 4b, transparent electrodes 4c and 4d formed respectively on the transparent glass substrates 4a and 4b, orientation factors (molecules) 4e of a dichroic coloring matter having an anisotropic light absorption property, and orientation factors (molecules) 4f of a host liquid crystal of a cholesteric-nematic phase transition type having a negative anisotropic dielectric property.

As shown in FIG. 3, the orientation factors 4f of the liquid crystal are oriented perpendicularly to the surfaces of the electrodes 4c and 4d (homeotropic orientation) while no voltage is applied to the electrode 4c. Therefore the first LCD 4 is transparent and nothing is indicated on the first LCD 4. Since a surface active agent is mixed in the liquid to enhance the homeotropic orientation of the orientation factors 4f, in this state, the first LCD 4 has a high transparency. When a voltage is applied to the electrode 4c, the orientation factors 4f are twisted about axes perpendicular to the surfaces of the electrodes 4c and 4d, which is the property of cholesteric liquid crystals, in a cholesteric phase.

When the orientation factors 4f of the host liquid crystal is in the cholesteric phase, the orientation factors (molecules) 4e of the dichroic coloring matter added as guest having an anisotropic light absorption property are twisted similarly to the orientation factors 4f of the host liquid crystal. Consequently, all the molecules of the coloring matter are oriented in all directions within a plane parallel to the surfaces of the electrodes 4c and 4d. Since the coloring matter having an anisotropic light absorption property absorbs light in which the displacement direction of the vibrations is the same as the direction in which the orientation factors 4e of the dichroic coloring matter, all the light are absorbed by the coloring matter, so that the display on the first LCD 4 has a high contrast.

In the first embodiment, since the first LCD 4 is of a positive type, namely, an LCD which becomes opaque when a voltage is applied thereto, the transparent electrodes need not be formed over the entire surfaces of the transparent glass substrates 4a and 4b; the transparent electrodes may be formed only in areas corresponding to a pattern to be displayed. Therefore, leads are never displayed in the viewfinder.

To improve the contrast of the display pattern on the LCD, it will be achieved by coinciding the wavelength of the peak light absorption value of dichroic coloring matter with the wavelength of the peak value of human eye sensibility with light.

Figure 4:
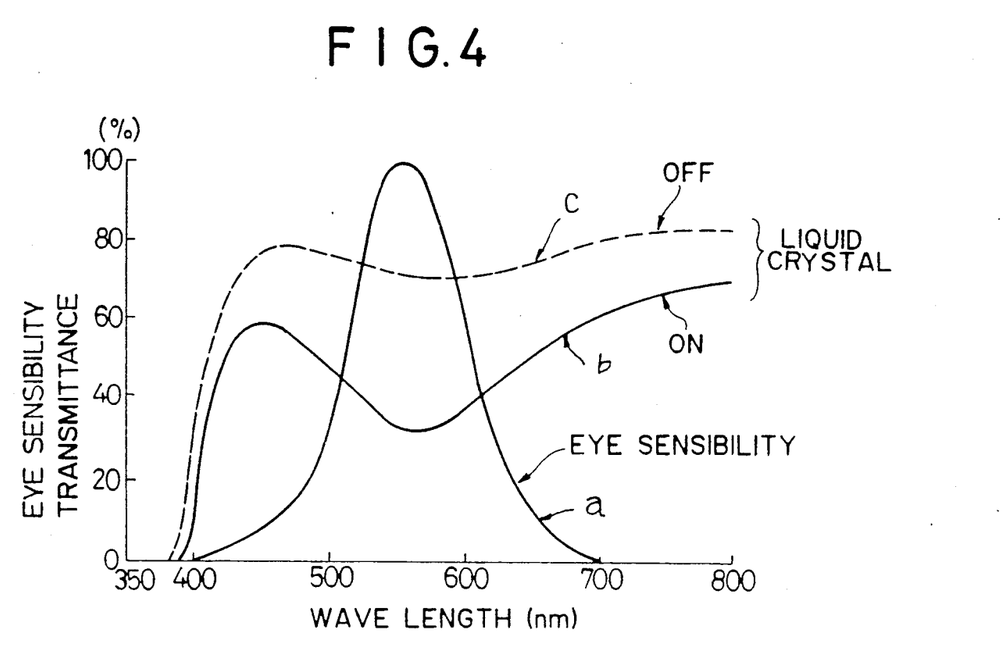
FIG. 4 shows an eye sensibility characteristic and a transmittance characteristic of a liquid crystal.

The human eye sensibility with light shows a peak value at the wavelength 555 nm as shown by a line (a) in FIG. 4, and the sensibility is reduced to the half of peak value at the wavelength 595 and 515 nm. Therefore, the contrast of the display pattern on the LCD will be improved by the use of dichroic coloring matter which shows a good light absorption characteristic at the wavelength of 500 to 600 nm, such as azo dye, anthraquinone dye and merocyanine dye. Lines (b) and (c) in FIG. 4 show a light transmittance of the LCD using the dichroic coloring matter as a guest. The line (b) shows the state that the voltage is applied to the electrode and the line (c) shows the state that the voltage is not applied to the electrode.

Figure 5:
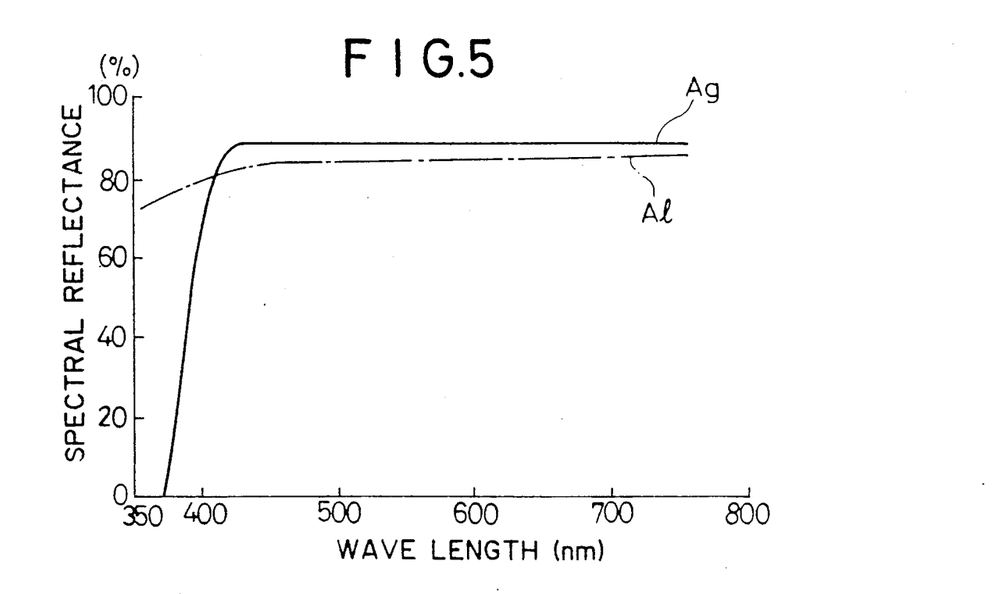
FIG. 5 is a spectral reflectance characteristic diagram of silver (Ag) and aluminum (Al)

Silver is evaporated on the light reflection surfaces of the pentagonal prism provided in the viewfinder optical system. A picture image produced in the viewfinder is colored in yellow slightly because the spectral reflectance of silver shows low value around 400 nm wavelength in comparison with that of aluminum as shown in FIG. 5.

A dichroic coloring matter, which is a guest material of the guest-host type LCD, selected from the matter having the high transmittance of around 400 to 500 nm wavelength (blue color region) will improve the yellow colored picture image in the viewfinder. The dye such as azo dye, anthraquinone dye, merocyanine dye will be suitable for this purpose.

Figure 6:
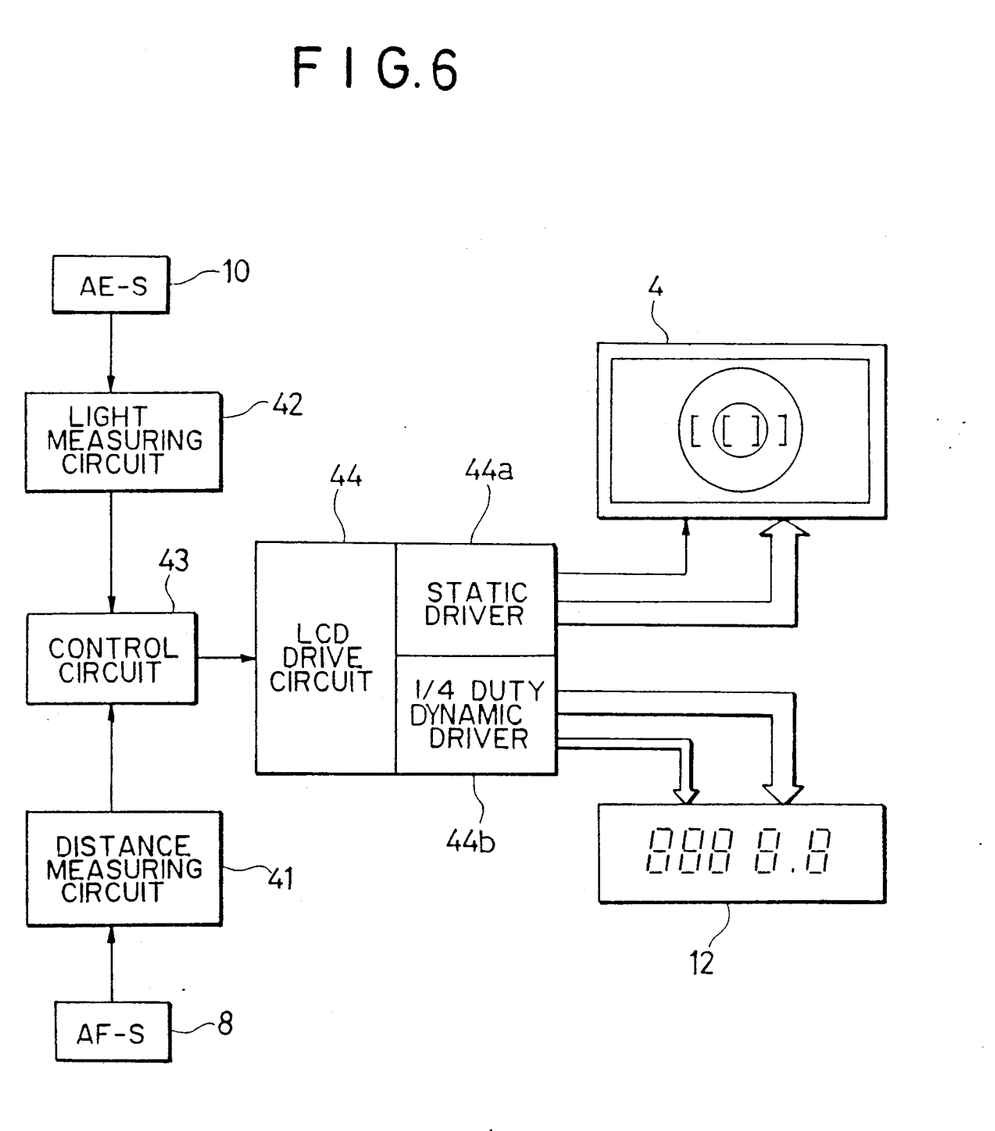
FIG. 6 is a block diagram of an LCD driving circuit.

Referring to FIG. 6 showing the driving circuit for driving the first LCD 4 and the second LCD 12, a control circuit 43 receives a distance signal produced by a distance measuring circuit 41 by processing a detection signal provided by the light receiving element 8 for automatic focusing, and a subject brightness signal produced by a light measuring circuit 42 by processing a detection signal provided by the light receiving element 10 for light measurement, and then gives control signals to driving mechanisms, not shown, for driving the lens, the diaphragm and the shutter, not shown, and gives photographing data signals representing photographing data including a distance measuring area, a light measuring area, a shutter speed and an aperture to an LCD driving circuit 44.

The LCD driving circuit 44 comprises a static driver 44a and a quarter-duty dynamic driver 44b. The static driver 44a drives the first LCD 4 for displaying patterns including those indicating the distance measuring area and the light measuring area. The quarter-duty dynamic driver 44b drives the second LCD 12 for displaying photographing data including shutter speed and aperture value. In dynamic driving mode, the higher the time sharing frequency (the lower duty cycle), the more segments can be driven or the smaller the number of terminals of the driver, but low voltage is always supplied to the segments which are not in an operative state. And further, the higher the time sharing frequency of dynamic driver, the less the difference of the voltage between the segments in the operative state and the segments not in the operative state.

Therefore, it is necessary to make an LCD surely operate ON and OFF display patterns despite small difference in the voltage supplied to the segments in the operative state and the segments not in the operative state, but it is not easy to obtain such an LCD as described above.

In general, it is not so difficult to drive the twisted nematic (TN) type LCD by dynamic driving mode with high time sharing frequency, but it is difficult to drive the guest-host type LCD by the same driving mode. On the contrary, it is not difficult to construct an LCD driven by static drive mode because no voltage is supplied to the segments which are not in the operative state.

In the embodiment, an LCD 12, used for displaying photographing data including shutter speed and aperture value, requests many segment electrodes for displaying numerals. On the other hand, an LCD 4, used for displaying photographic information such as distance measuring area and light measuring area, requests rather few segment electrodes. Then, an LCD 4 is made by a guest-host type LCD and is driven by static driving mode, and the LCD 12 is made by a twisted nematic (TN) type LCD and is driven by dynamic driving mode.

When time sharing frequency of dynamic driving mode is selected at low value (high duty cycle, e.g. $\frac{1}{2}$), it is possible to drive a guest-host type LCD. Therefore, the static driver 44a in the driving circuit 44 may be replaced with a $\frac{1}{2}$ duty dynamic driver.

A display system in a second embodiment according to the present invention will be described hereinafter with reference to FIGS. 7 to 10 as applied to the real image viewfinder of a compact camera provided with an individual viewfinder optical system separate from a photographic lens system. The compact camera is supposed to be provided with an AF system (automatic focusing system) capable of operating in a multiple point active spot distance measuring mode and an AE control system (automatic exposure control system) capable of operating in either a averaged light measuring mode or a multiple spot light measuring mode including an automatic spot light measuring mode and a manual spot light measuring mode, and capable of operating in a standard taking mode and in a trimming mode for taking pictures portions of which are to be enlarged in printing to provide photographs resembling telephotographs taken by a telephoto lens. As shown in FIG. 10, the AF system drives a plurality of luminous elements, in FIG. 10, five luminous elements $L_1$ to $L_5$, sequentially, and receives rays of light reflected by a plurality of objects $X_1$ to $X_5$ by light receiving elements $P_1$ to $P_5$ to detect the distances between the focal plane of the photographic lens of the camera and the objects $X_1$ to $X_5$. The nearest object, in FIG. 10, the object $X_2$, is regarded as the principal object and the taking lens of the camera is focused on the nearest object $X_2$. In an automatic spot light measuring mode, the AE control system measures the brightness of the nearest object determined by the AF system. In a manual spot light measuring mode, the AE control system measures the brightness of the object which is selected by the photographer. In averaged light measuring mode, the AE control system measures the averaged brightness of the photographing field.

Figure 7:
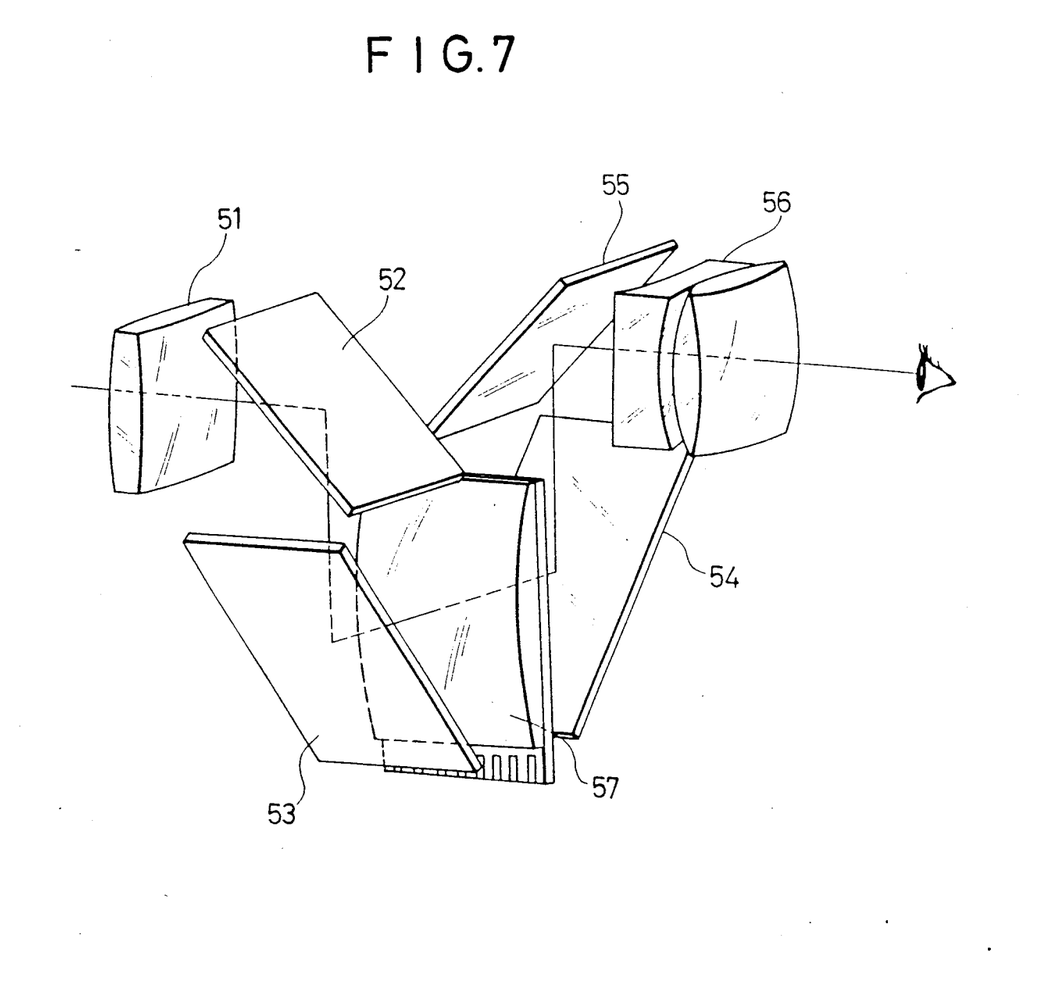
FIG. 7 is a perspective view of the optical system of a real image viewfinder for a compact camera employing a display system in a second embodiment according to the present invention.

Referring to FIG. 7, the optical system of the real image viewfinder of the compact camera comprises an object lens 51, a porro mirror consisted of four mirrors 52, 53, 54 and 55 for forming an erect image, an eyepiece 56, and an LCD 57 of a guest-host type having one spherical surface, disposed near the image forming position of the objective lens 51 and serving also as a condenser lens.

The object lens 51, eyepiece 56 and condenser lens may be formed with polymethacrylate (PMMA) synthetic resin or the like which contains an ultra-violet rays absorptin material. It is not necessary to form all of these optical elements with such resin, but some optical elements, arranged in the most effective place, should be formed with these resin.

Figure 8:
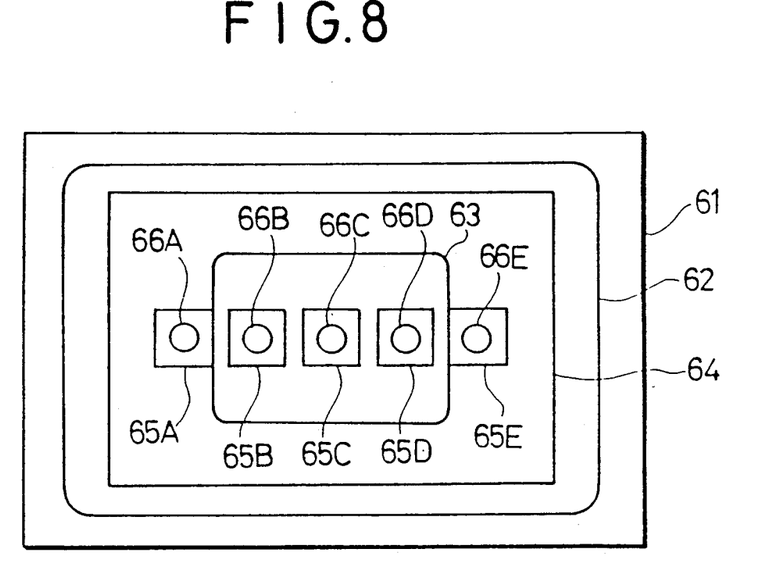
FIG. 8 is an illustration of a pattern of photographing data displayed within the viewfinder by the display system of FIG. 7.

Shown in FIG. 8 is a pattern to be displayed formed on the LCD 51. The pattern includes all the figures to be displayed in the viewfinder, such as a first rectangular FIG. 61 demarcating the field of the viewfinder, a second rectangular FIG. 62 showing a photographing region for the standard photographing mode, a third rectangular FIG. 63 showing a photographing region for the trimming mode, a fourth rectangular FIG. 64 showing a light measuring area pattern for the averaged light measuring mode, square FIGS. 65A, 65B, 65C, 65D and 65E showing light measuring area patterns for the spot light measuring mode, and circular FIGS. 66A, 66B, 66C, 66D and 66E showing distance measuring area patterns. Either the rectangular FIG. 62 or 63 is displayed according to a selected photographing mode. In the automatic spot light measuring mode, only one of the square patterns 65A to 65E corresponding to a light measuring area selected for light measurement is displayed. In the manual spot light measuring mode, only one of the square patterns 65A to 65E corresponding to a selected light measuring area is displayed. In the averaged light measuring mode, the fourth rectangular pattern 64 is displayed. Only one of the circular patterns 66A to 66E corresponding to an object on which the photographic lens is focused is displayed; for example, the circular pattern 66B corresponding to the light receiving element $P_2$ receiving light reflected by the nearest object $X_2$, in the case of FIG. 10.

Figure 9:
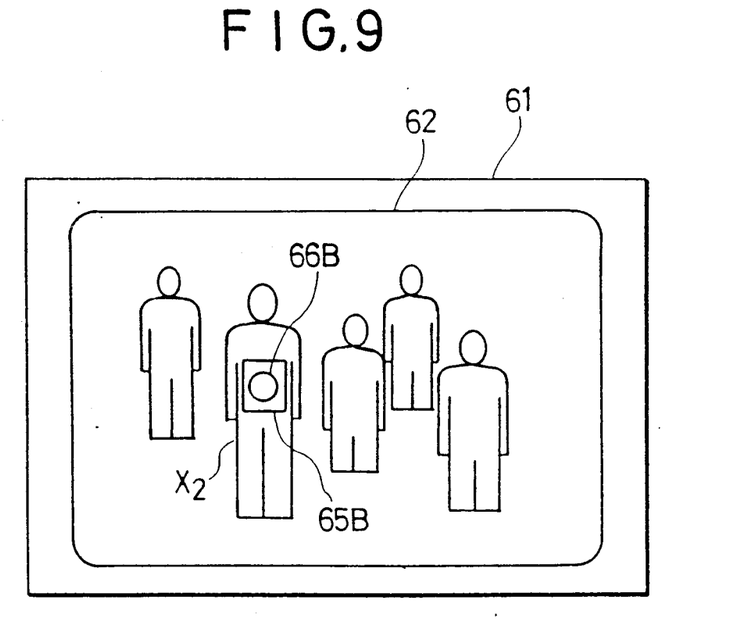
FIG. 9 is an example of an image displayed in the viewfinder by the display system of FIG. 7.
Figure 10:
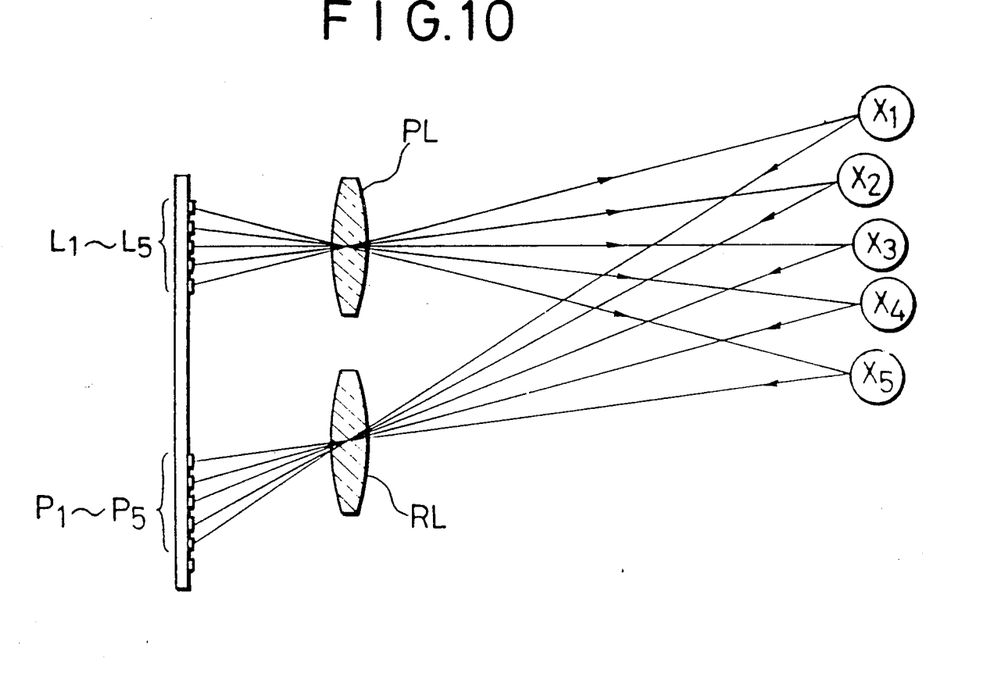
FIG. 10 is a diagrammatic illustration of assistance in explaining the principle of multiple point distance measurement.

FIG. 9 shows an example of a picture displayed in the viewfinder. In this case, the standard photographing mode and the automatic spot light measuring mode are selected, the photographic lens is focused on the nearest object $X_2$ corresponding to the light receiving element $P_2$, and hence the second rectangular pattern 62, the square pattern 65B corresponding to the object $X_2$ and the circular FIG. 66B corresponding to the object $X_2$ are displayed.

Of course, the camera can be provided with selecting means for manually selecting one of the circular patterns 66A to 66E, and the AF system can make the lens focused on an object in the area which is shown by the manually selected circular pattern.

As is apparent from the foregoing description, according to the present invention, the LCD provided with a pattern to be displayed in the viewfinder intercepts the least quantity of light and has a high light transmittance owing to the use of transparent glass places instead of polarizing plate, and the use of a dichroic coloring matter as guest in combination with a liquid crystal enhances the shading performance of the LCD to display the pattern in a high contrast within the viewfinder because the molecules of the dichroic coloring matter are twisted together with the molecules of the liquid crystal to intercept light waves vibrating in all directions of displacement when a voltage is applied to electrodes of the LCD to cause the phase transition of the liquid crystal.

Having described out invention as related to the embodiment shown in the accompanying drawings, it is our intention that the invention be not limited by any of the details of the description, unless otherwise specified, but rather be construed broadly within its spirit and scope as set out in the accompanying claims.

What is claimed is:

1. A display system for displaying information in the viewfinder of a camera, comprising a liquid crystal display of a guest-host type disposed on the optical path of the viewfinder to display information in the viewing field of the viewfinder in a positive opaque pattern on a transparent background and employing a liquid crystal of a cholesteric-nematic phase transition type having a negative anisotropic dielectric property as host, and a dichroic coloring matter having an anisotropic light absorption property as guest.

2. A display system for displaying information in the viewfinder of a camera according to claim 1, wherein said camera is provided with a plurality of light measuring means for individually measuring light in a plurality of light measuring areas defined in the photographing field thereof, and said liquid crystal device has a plurality of light measuring area indicating patterns corresponding to the plurality of light measuring areas.

3. A display system for displaying information in the viewfinder of a camera according to claim 1, wherein said camera has a plurality of light measuring areas defined in the photographing field thereof, the camera is provided with light measuring means for selectively measuring light for one of the plurality of light measuring areas, said liquid crystal display has a plurality of light measuring area indicating patterns corresponding to the plurality of light measuring areas and is capable of displaying only the light measuring area indicating pattern corresponding to the selected light measuring area.

4. A display system for displaying information in the viewfinder of a camera according to claim 1, wherein said camera has a plurality of distance measuring areas defined in the taking field thereof and is provided with a plurality of distance measuring means for individually measuring the distances between the focal plane of the photographic lens of the camera and portions of an object respectively corresponding to the distance measuring areas, and said liquid crystal display has distance measuring area indicating patterns for indicating the plurality of distance measuring areas.

5. A display system for displaying information in the viewfinder of a camera according to claim 4, wherein said camera is provided further with selecting means for selecting one of the plurality of distance measuring areas on the basis of measured distance data representing the distances between the focal plane of the photographic lens of the camera and the portions of an object corresponding to the distance measuring areas, and said liquid crystal display displays only the distance measuring area indicating pattern corresponding to the selected distance measuring area.

6. A display system for displaying information in the viewfinder of a camera according to claim 1, wherein said camera is capable of focusing the photographic lens thereof either in a first AF mode in which the photographic lens is focused on the basis of distance data of a first distance measuring area located substantially in the central portion of the photographing field, or a second AF mode in which the photographic lens thereof is focused on the basis of distance data of a second distance measuring area wider than and including the first distance measuring area, said liquid crystal display is provided with distance measuring area indicating patterns for indicating the first and second distance measuring areas, said liquid crystal display displays the distance measuring area indicating pattern indicating the first distance measuring area when the first AF mode is selected, and said liquid crystal display displays the distance measuring area indicating pattern indicating the second distance measuring area when the second AF mode is selected.

7. A display system for displaying information in the viewfinder of a camera according to claim 1, further comprising a liquid crystal display of a twist nematic type for displaying characters indicating photographing data, first driving means for driving said guest-host type liquid crystal display, and second driving means for driving said twist-nematic type liquid crystal display.

8. A display system for displaying information in the viewfinder of a camera according to claim 7, wherein said liquid crystal display of a guest-host type is driven by static driving means which applies a voltage across the electrodes of the first liquid crystal display, and said liquid crystal display of a twist nematic type is driven by dynamic driving means which applies a voltage repetitively across the electrodes of the second liquid crystal display.

9. A display system for displaying information in the viewfinder of a camera according to claim 1, wherein said viewfinder comprises an objective lens, a porro mirror consisted of four mirrors, and an eyepiece, and said liquid crystal display of a guest-host type is disposed on or near the focal plane of the objective lens of the viewfinder.

10. A display system for displaying information in the viewfinder of a camera according to claim 9, wherein one of the glass faces of said liquid crystal display of a guest-host type has a spherical outer surface, and serves as a condenser lens.

11. A display system as claimed in claim 1, wherein the local nimimum value of the transmission factor the liquid crystal display of a guest-host type is within the wavelength range of 555±40 nm when the voltage is applied to the liquid crystal display of a guest-host type, and the local maximum value of the transmission factor of the liquid crystal display of a guest-host type is within the wavelength range of 400 nm to 500 nm when the voltage is not applied to the liquid crystal display of a guest-host type.

12. A display system as claimed in claim 11, wherein said dichroic coloring matter is azo dye.

13. A display system as claimed in claim 11, wherein said dichroic coloring matter is anthraquinone dye.

14. A display system as claimed in claim 11, wherein said dichroic coloring matter is merocyanine dye.

15. A display system as claimed in claim 1, wherein said viewfinder has an optical member which includes ultra-violet rays absorbing matter.

16. A display system for displaying information in the viewfinder of a camera, comprising a liquid crystal display disposed in the optical path of the viewfinder, wherein an optical member including matter absorbing the ultra-violet rays is disposed between an objective lens of the viewfinder and the liquid crystal display.

17. A display system as claimed in claim 16, wherein the optical member is the objective lens of the viewfinder.

18. A display system as claimed in claim 16, wherein another optical member including matter absorbing the ultra-violet rays is disposed between the liquid crystal display and an eyepiece of the viewfinder.

19. A display system as claimed in claim 18, wherein said another optical member is the eyepiece of the viewfinder.

20. A display system as claimed in claim 16, wherein said ultra-violet rays absorbing matter is selected from salicylate, benzophenone, benzotriazole and cyanoacrylate.

* * * * *

UNITED STATES PATENT AND TRADEMARK OFFICE
CERTIFICATE OF CORRECTION

PATENT NO. : 5,019,854                    Page 1 of 2

DATED : May 28, 1991

INVENTOR(S) : Hiromu Mukai, et al.

It is certified that error appears in the above-identified patent and that said Letters Patent is hereby corrected as shown below:

```
     In col. 2, line 27, after "of", insert --the--.
     In col. 3, line 31, after "element" (first
occurrence), insert --10--.
     In col. 3, line 43, delete "of".
     In col. 3, line 44, change "is" to --are--.
     In col. 3, line 47, delete "of".
     In col. 3, line 48, after "of", insert --an--.
     In col. 6, line 60, change "absorptin" to
--absorption--.
     In col. 6, line 63, change "these" to --the--.
     In col. 7, line 44, change "places" to --plates--.
     In col. 7, line 54, change "out" to --our--.
```

UNITED STATES PATENT AND TRADEMARK OFFICE
CERTIFICATE OF CORRECTION

PATENT NO. : 5,019,854

DATED : May 28, 1991

INVENTOR(S) : Hiromu Mukai, et al.

It is certified that error appears in the above-identified patent and that said Letters Patent is hereby corrected as shown below:

In col. 7, line 55, change "embodiment" to --embodiments--.

In col. 7, line 63 (claim 1, line 3), change "on" to --in--.

In col. 9, line 3 (claim 7, last line), change "twist-nematic" to --twist nematic--.

In col. 9, line 16 (claim 9, line 4), change "consisted" to --consisting--.

In col. 9, line 26 (claim 11, line 2), change "nimimum" to --minimum--.

Signed and Sealed this

Fifth Day of January, 1993

Attest:

DOUGLAS B. COMER

*Attesting Officer*     *Acting Commissioner of Patents and Trademarks*